UNITED STATES PATENT OFFICE.

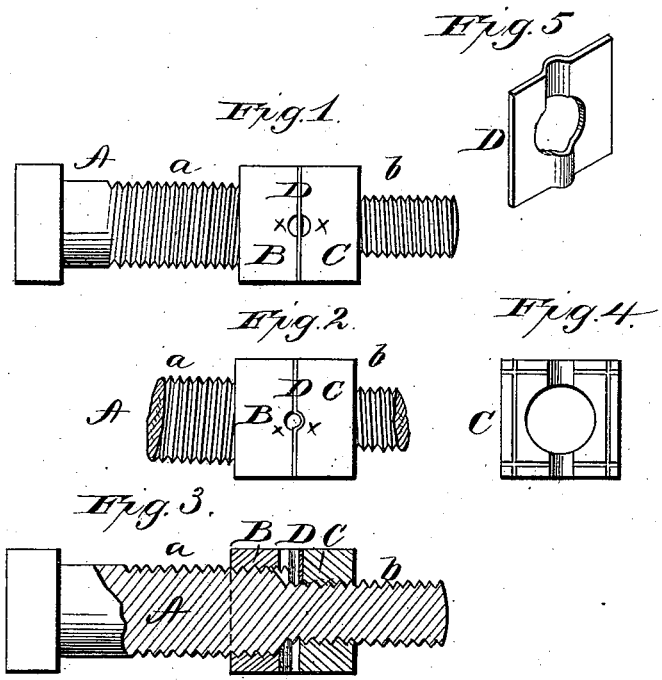

ROBERT T. MORTON, OF CLARKSVILLE, MISSOURI.

NUT-LOCK.

SPECIFICATION forming part of Letters Patent No. 227,284, dated May 4, 1880.

Application filed February 28, 1880.

*To all whom it may concern:*

Be it known that I, ROBERT T. MORTON, of Clarksville, in the county of Pike, and in the State of Missouri, have invented certain new and useful Improvements in Nut-Locks; and I do hereby declare that the following is a full, clear, and exact description thereof, reference being had to the accompanying drawings, and to the letters of reference marked thereon, making a part of this specification.

My invention relates to bolts having both right and left hand screw-threads with corresponding nuts thereon; and it consists in a sheet-metal washer interposed between the two nuts and capable of being struck up or indented into grooves made in the adjacent faces of the two nuts, so that the same will be locked together on the bolt, as will be hereinafter more fully set forth.

In order to enable others skilled in the art to which my invention appertains to make and use the same, I will now proceed to describe its construction and operation, referring to the annexed drawings, in which—

Figure 1 is a side view of a bolt and nuts with the interposed washer before the same is struck up for locking the nuts. Fig. 2 is a partial side view thereof after the washer has been struck up for locking the nuts. Fig. 3 is a longitudinal section of the bolt, nuts, and washer. Figs. 4 and 5 are views of the washer.

A represents a bolt provided with two sets of screw-threads, $a$ and $b$, one being right-hand and the other left-hand, and on these are placed the nuts B and C, which are, of course, tapped to correspond with the right and left hand screw-threads.

The adjacent faces of the two nuts are provided with grooves $x\ x$, which may be arranged either radially or otherwise, as may be desired.

Between the two nuts B C is interposed a sheet-metal washer, D, which does in no wise interfere with the proper screwing up or tightening of the two nuts. After the nuts have been tightened this washer is, by means of a suitable tool, struck up or indented, so as to fit or enter into one or more of the grooves on each nut, and thereby form a lock which prevents either nut from turning on the bolt.

If desired, the washer may be struck up to fit the grooves in one of the nuts when the same is first placed on the bolt, and then it will only be necessary to strike up or indent the washer to fit the other nut after the nuts have been tightened.

Having thus fully described my invention, what I claim as new, and desire to secure by Letters Patent, is—

The combination, with a right and left threaded bolt, with two corresponding nuts having grooved inner faces, of an interposed sheet-metal washer capable of being struck up or indented to fit one or more of the grooves in each nut, substantially as herein set forth.

In testimony that I claim the foregoing I have hereunto set my hand this 26th day of February, 1880.

ROBERT T. MORTON.

Witnesses:
    H. AUBREY TOULMIN,
    J. J. MCCARTHY.